Sept. 8, 1936.  H. P. NORDMARK  2,053,349
SEAT
Filed July 27, 1935   2 Sheets-Sheet 1

Witness:
Geo. L. Chapel

INVENTOR.
Henry P. Nordmark
BY
ATTORNEYS

Sept. 8, 1936. H. P. NORDMARK 2,053,349

SEAT

Filed July 27, 1935 2 Sheets-Sheet 2

Witness:
Geo L. Chapel

INVENTOR.
Henry P. Nordmark
BY Rice and Rice
ATTORNEYS.

Patented Sept. 8, 1936

2,053,349

UNITED STATES PATENT OFFICE 2,053,349

SEAT

Henry P. Nordmark, Grand Rapids, Mich., assignor to American Seating Company, Grand Rapids, Mich., a corporation of New Jersey Application July 27, 1935, Serial No. 33,479

1 Claim. (Cl. 155—33)

The instant invention relates to seats and more particularly to aisle seats for buses and the like.

The primary objects of the present invention are to provide a detachably secured auxiliary seat for use in the aisle of a bus or the like; to provide such a seat which may be readily detachably secured to an adjacent permanent seat when desired for use and which may be conveniently detached therefrom when not desired for use; to provide a seat having a detachably secured arm interchangeable with a detachably secured auxiliary seat; and, to provide novel means for detachably securing the seats together.

An illustrative embodiment of the invention is shown in the accompanying drawings, wherein.

Figure 1:
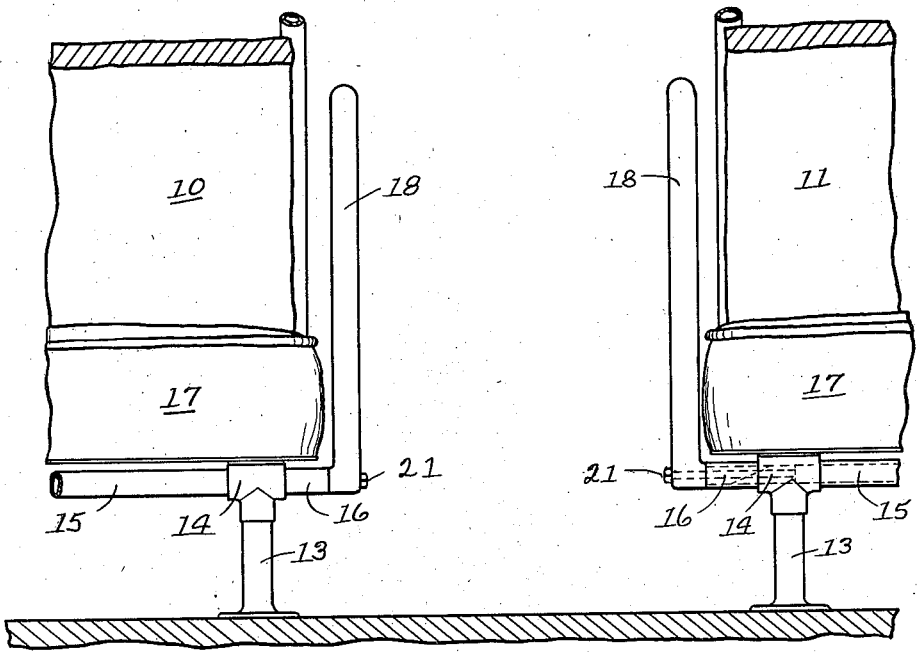
Figure 1 is a fragmentary front elevational view of a pair of oppositely disposed bus seats permanently secured to the floor of the bus in spaced relation to form an aisle therebetween.

Referring to the drawings in which like parts of the structure shown are designated by the same numerals in the several views, a pair of oppositely disposed chairs generally designated 10, 11 are here illustrated as permanently secured to the floor 12 of a motor bus in spaced relation to form an aisle therebetween.

Tubular legs 13 having an upper transverse portion 14 fixedly embrace a pair of spaced and horizontally disposed tubular members 15 inside their respective open ends which form sleeves 16. These tubular members or sleeves provide a supporting frame for the seats 17 and a U-shaped tubular arm rest 18 is provided at each of its free ends with a laterally projecting tubular core angularly split as best shown in Figure 5 into portions 19, 20.

The split portion 20 is internally screw threaded and a threaded bolt 21 for each angularly split core is adapted to slidably pass through the split portion 19 of each core and threadingly engage the internal threads of the split portion 20 thereof. By turning the head of the bolt 21 into such threading engagement with the split core 20, the angularly split portions 19, 20 are drawn together and into frictional engagement with the sleeve 16 on its opposite internal sides all as best shown in Figure 5.

Figure 4:
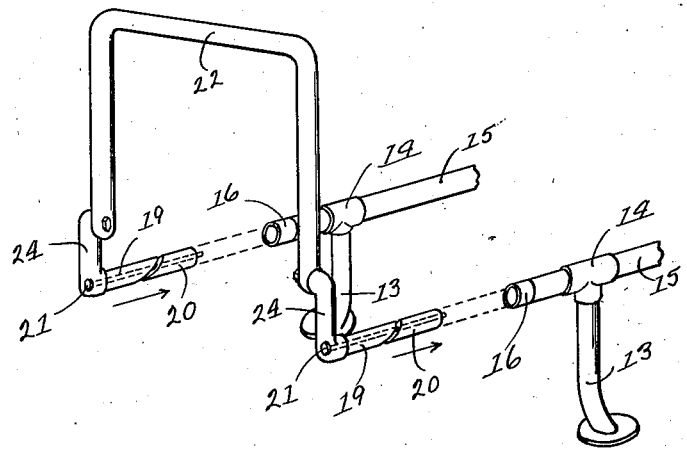
Figure 4 is a fragmentary perspective view of a portion of the permanent seat with its arm rest removed, the frame member of the auxiliary seat being shown in position before it is slid into detachably secured relation with its permanent seat.
Figure 6:
Figure 6 is an end elevational view thereof.
Figure 5:
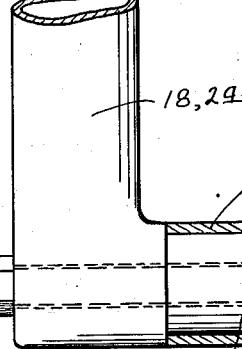
Figure 5 is an enlarged fragmentary front elevational view, partly in section, of a portion of the permanent seat support and a portion of the detachable interchangeable arm rest or the detachable auxiliary seat support showing the manner in which the interchangeable arm rest or auxiliary seat is maintained in detachably secured relation.
Figure 5:
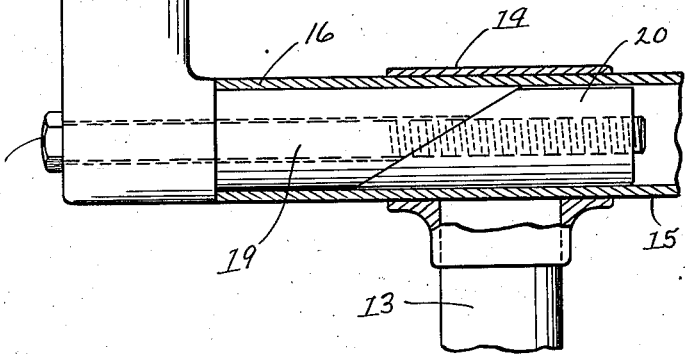

An auxiliary U-shaped seat frame 22 for supporting a seat 23 is pivotally connected at its free ends to a pair of depending members 24 as best shown in Figure 4 and each depending member is provided with a laterally projecting tubular core likewise angularly split in the manner shown in Figure 5 into portions 19, 20 and retained together in the same manner as by the bolt 21.

Figures 2, 3:
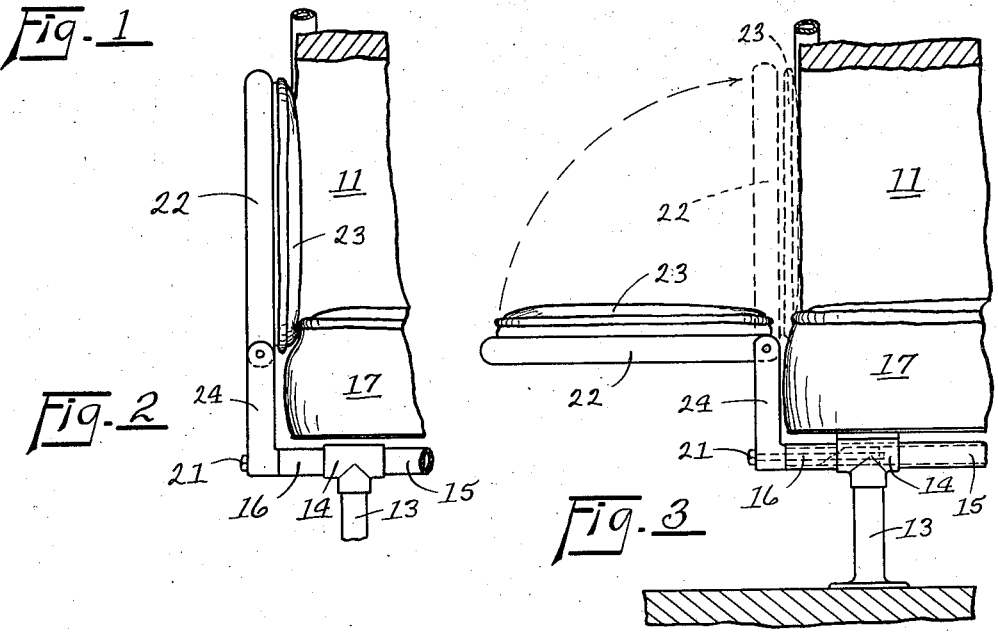
Figure 2 is a fragmentary front elevational view of a permanent seat with its arm rest removed and the auxiliary seat detachably secured thereto, the auxiliary seat being shown in upwardly folded position.
Figure 3 is a view similar to Figure 2 but showing the auxiliary seat in downwardly folded position in the aisle for use from its position as shown in dotted lines.

In instances where it is desired to use the auxiliary seat 23, the arm rest 18 is removed by loosening the bolts 21 which releases the angularly split cores 19, 20 from engagement with their embracing sleeves 16 and the angularly split cores 19, 20 of the auxiliary seat frame 22 are caused to be telescopingly slid into the sleeves 16 as shown in Figure 2, whereupon the auxiliary seat 23 may be folded downwardly into the aisle as shown in Figure 3 to provide an auxiliary or aisle chair.

It will thus be seen that the seat supporting frame in combination with a detachably secured arm rest interchangeable with a detachably secured auxiliary seat supporting frame is herein shown and described which is particularly well adapted for installation in motor buses.

While but one specific embodiment of this invention has been herein shown and described, it will be understood that numerous details of the construction shown may be altered or omitted without departing from the spirit of this invention as defined by the following claim.

I claim:

In a structure of the class described, a seat supporting frame having a pair of spaced sleeves, a detachably secured auxiliary member therefor having a pair of spaced and angularly split tubular cores adapted to register with and telescopingly fit within said spaced sleeves, one split portion of each core being internally threaded, and a threaded bolt for each angularly split core adapted to slidably pass through one split portion of each core and to threadingly engage the internal threads of the other split portion thereof for drawing the angularly split portions together and into frictional engagement with their respective sleeves.

HENRY P. NORDMARK.